US011500914B2

(12) United States Patent
Kalia et al.

(10) Patent No.: US 11,500,914 B2
(45) Date of Patent: Nov. 15, 2022

(54) QUERY RECOMMENDATION TO LOCATE AN APPLICATION PROGRAMMING INTERFACE

(71) Applicant: International Business Machines Corporation, Armonk, NY (US)

(72) Inventors: Anup Kalia, Elmsford, NY (US); Jin Xiao, Ossining, NY (US); Yu Deng, Yorktown Heights, NY (US); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 212 days.

(21) Appl. No.: 16/122,552

(22) Filed: Sep. 5, 2018

(65) Prior Publication Data

US 2020/0074002 A1   Mar. 5, 2020

(51) Int. Cl.
*G06F 16/36*      (2019.01)
*G06F 16/332*     (2019.01)
*G06F 16/33*      (2019.01)
*G06F 40/30*      (2020.01)

(52) U.S. Cl.
CPC ........ *G06F 16/367* (2019.01); *G06F 16/3326* (2019.01); *G06F 16/3334* (2019.01); *G06F 40/30* (2020.01)

(58) Field of Classification Search
CPC ............... G06F 16/367; G06F 16/3334; G06F 16/3326; G06F 40/30
See application file for complete search history.

(56) References Cited

U.S. PATENT DOCUMENTS

| | | | |
|---|---|---|---|
| 8,060,531 B2 | 11/2011 | Edelstein et al. | |
| 9,396,046 B2 | 7/2016 | Laredo et al. | |
| 9,836,534 B2 | 12/2017 | Laredo et al. | |
| 9,886,247 B2 | 2/2018 | Laredo et al. | |
| 9,916,377 B2 | 3/2018 | Bergs et al. | |
| 9,922,344 B1* | 3/2018 | Christophe | G06Q 30/0256 |
| 2002/0129015 A1* | 9/2002 | Caudill | G06F 16/353 |

(Continued)

OTHER PUBLICATIONS

Mazumder, Context-aware Path Ranking for Knowledge Base Completion, 2017, International Joint Conference on Artificial Intelligence, 1195-1201 (Year: 2017).*

(Continued)

*Primary Examiner* — James Trujillo
*Assistant Examiner* — J Mitchell Curran
(74) *Attorney, Agent, or Firm* — Amin, Turocy & Watson, LLP

(57) ABSTRACT

Systems, computer-implemented methods, and computer program products to facilitate query recommendation are provided. According to an embodiment, a system can comprise a memory that stores computer executable components and a processor that executes the computer executable components stored in the memory. The computer executable components can comprise an ontology component that can generate an ontology based on unstructured data of a description of an application programming interface. The computer executable components can further comprise a reasoner component that can identify one or more terms of the ontology that correspond semantically to a term of a query.

20 Claims, 10 Drawing Sheets

(56) References Cited

U.S. PATENT DOCUMENTS

| | | | |
|---|---|---|---|
| 2011/0179081 A1* | 7/2011 | Ovsjanikov | G06F 16/26 707/780 |
| 2017/0116326 A1 | 4/2017 | Muthusamy et al. | |
| 2018/0052870 A1 | 2/2018 | Stojanovic et al. | |
| 2018/0165135 A1* | 6/2018 | Bahrami | G06F 9/541 |

OTHER PUBLICATIONS

Aleman-Meza, Context-Aware Semantic Association Ranking, 2003 (Year: 2003).*
Thung, API recommendation system for software development, ASE 2016 Proceedings of the 31st IEEE/ACM International Conference on Automated Software Engineering, Sep. 7, 2016, pp. 896-899.
Yang, et al., Query by Document, WSDM, Feb. 12, 2009, 10 Pages.
Zheng, et al., Key Concept Identification for Medical Information Retrieval, Proceedings of the 2015 Conference on Empirical Methods in Natural Language Processing, Sep. 21, 2015, pp. 579-584.
Lee, et al., Generating Queries from User-Selected Text, 2012, 10 Pages.
Miahdabi, et al., Automatic Refinement of Patent Queries using Concept Importance Predictors, SIGIR'12, Aug. 16, 2012, 10 Pages.
Weng, et al., Query by Document via a Decomposition-Based Two-Level Retrieval Approach, SIGIR, Jul. 28, 2011, pp. 505-514.
Agrawal, et al., Similarity Search using Concept Graphs, CIKM, Nov. 7, 2014, 10 Pages.
WS4J Demo, http://ws4jdemo.appspot.com/, Last acessed Aug. 29, 2018, 1 Page.

* cited by examiner

QUERY RECOMMENDATION TO LOCATE AN APPLICATION PROGRAMMING INTERFACE

BACKGROUND

The subject disclosure relates to decision-making systems, and more specifically, to recommendation of a query to locate an application programming interface.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate query recommendation are described.

According to an embodiment, a system can comprise a memory that stores computer executable components and a processor that executes the computer executable components stored in the memory. The computer executable components can comprise an ontology component that can generate an ontology based on unstructured data of a description of an application programming interface. The computer executable components can further comprise a reasoner component that can identify one or more terms of the ontology that correspond semantically to a term of a query.

According to another embodiment, a computer-implemented method can comprise generating, by a system operatively coupled to a processor, an ontology based on unstructured data of a description of an application programming interface. The computer-implemented method can further comprise identifying, by the system, one or more terms of the ontology that correspond semantically to a term of a query.

According to yet another embodiment, a computer program product that can facilitate a query recommendation process is provided. The computer program product can comprise a computer readable storage medium having program instructions embodied therewith, the program instructions can be executable by a processing component to cause the processing component to generate, by the processor, an ontology based on unstructured data of a description of an application programming interface. The program instructions can further cause the processing component to identify, by the processor, one or more terms of the ontology that correspond semantically to a term of a query.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
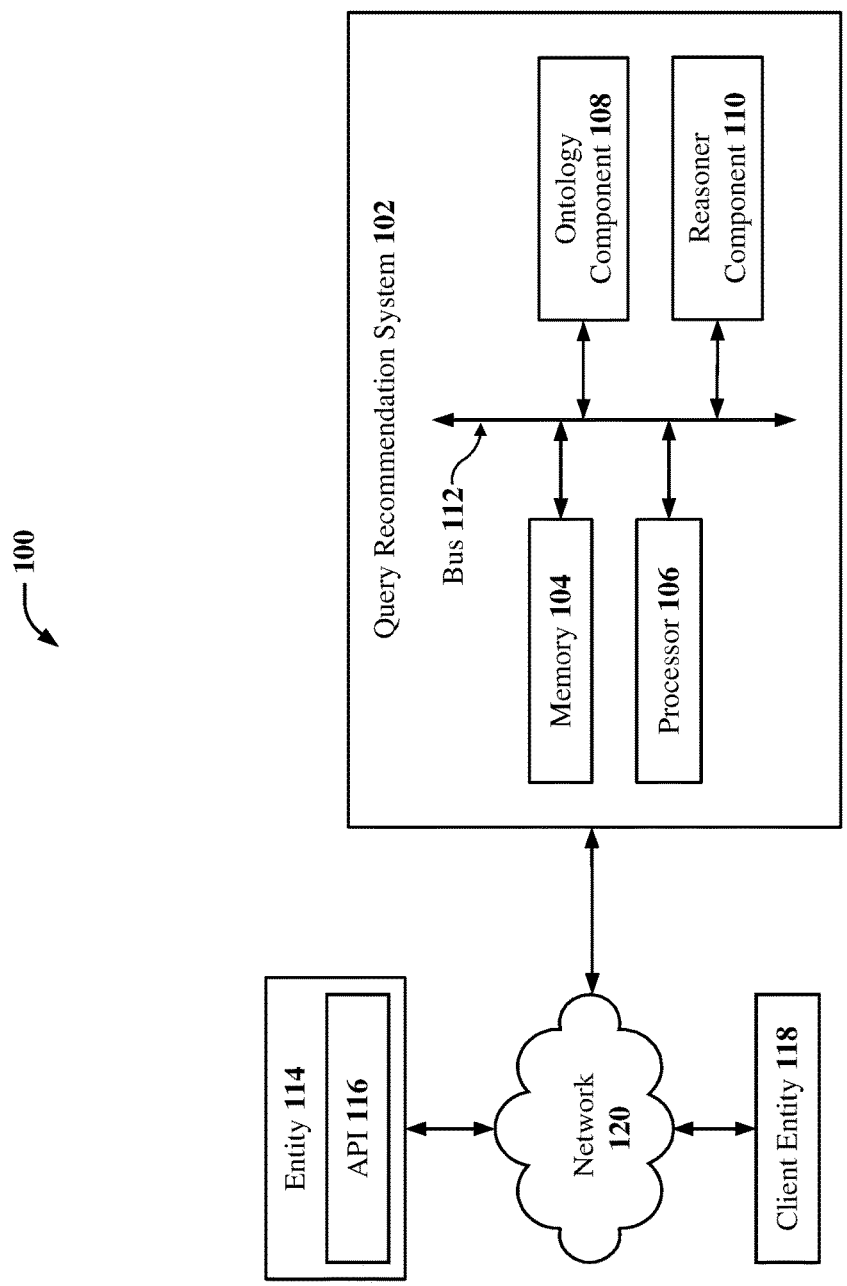
FIG. 1 illustrates a block diagram of an example, non-limiting system that facilitates query recommendation components in accordance with one or more embodiments described herein.

FIG. 1 illustrates a block diagram of an example, non-limiting system 100 that facilitates query recommendation components in accordance with one or more embodiments described herein. According to several embodiments, system 100 can comprise a query recommendation system 102. In some embodiments, query recommendation system 102 can comprise a memory 104, a processor 106, an ontology component 108, a reasoner component 110, and/or a bus 112. In some embodiments, query recommendation system 102 can be in communication with one or more entities 114 and/or one or more client entities 118, via a network 120. In some embodiments, entity 114 can comprise one or more application programming interfaces (API) 116.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100, query recommendation system 102, entity 114, API 116, and/or client entity 118 can further comprise various computer and/or computing-based elements described herein with reference to operating environment 1000 and FIG. 10. In several embodiments, such computer and/or computing-based elements can be used in connection with implementing one or more of the systems, devices, components, and/or computer-implemented operations shown and described in connection with FIG. 1 or other figures disclosed herein.

According to multiple embodiments, memory 104 can store one or more computer and/or machine readable, writable, and/or executable components and/or instructions that, when executed by processor 106, can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to query recommendation system 102, ontology component 108, reasoner component 110, entity 114, API 116, and/or client entity 118.

In some embodiments, memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 1016 and FIG. 10. Such examples of memory 104 can be employed to implement any embodiments of the subject disclosure.

According to multiple embodiments, processor 106 can comprise one or more types of processors and/or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, and/or another type of processor.

In some embodiments, query recommendation system 102, memory 104, processor 106, ontology component 108, and/or reasoner component 110 can be communicatively, electrically, and/or operatively coupled to one another via a bus 112 to perform functions of system 100, query recommendation system 102, and/or any components coupled therewith. In several embodiments, bus 112 can comprise one or more memory bus, memory controller, peripheral bus, external bus, local bus, and/or another type of bus that can employ various bus architectures. Further examples of bus 112 are described below with reference to system bus 1018 and FIG. 10. Such examples of bus 112 can be employed to implement any embodiments of the subject disclosure.

In some embodiments, query recommendation system 102 can comprise one or more computer and/or machine readable, writable, and/or executable components and/or instructions that, when executed by processor 106, can facilitate performance of operations defined by such component(s) and/or instruction(s). Further, in numerous embodiments, any component associated with query recommendation system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, ontology component 108, reasoner component 110, and/or any other components associated with query recommendation system 102 as disclosed herein (e.g., communicatively, electronically, and/or operatively coupled with and/or employed by query recommendation system 102), can comprise such computer and/or machine readable, writable, and/or executable component(s) and/or instruction(s). Consequently, according to numerous embodiments, query recommendation system 102 and/or any components associated therewith as disclosed herein, can employ processor 106 to execute such computer and/or machine readable, writable, and/or executable component(s) and/or instruction(s) to facilitate performance of one or more operations described herein with reference to query recommendation system 102 and/or any such components associated therewith.

In some embodiments, query recommendation system 102, entity 114, and/or client entity 118 can comprise any type of component, machine, device, facility, apparatus, and/or instrument that comprises a processor and/or can be capable of effective and/or operative communication with a wired and/or wireless network. All such embodiments are envisioned. For example, query recommendation system 102, entity 114, and/or client entity 118 can comprise a server device, a computing device, a general-purpose computer, a special-purpose computer, a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

In some embodiments, the various components of the system 100 (e.g., query recommendation system 102, entity 114, client entity 118, etc.) can be coupled (e.g., communicatively, electrically, operatively, etc.) via a data cable (e.g., High-Definition Multimedia Interface (HDMI), recommended standard (RS) 232, Ethernet cable, etc.). In some embodiments, the various components of the system 100 (e.g., query recommendation system 102, entity 114, client entity 118, etc.) can be coupled (e.g., communicatively, electrically, operatively, etc.) via network 120.

According to multiple embodiments, network 120 can comprise wired and wireless networks, including, but not limited to, a cellular network, a wide area network (WAN) (e.g., the Internet) or a local area network (LAN). For example, query recommendation system 102 can communicate with one or more entities 114 and/or client entities 118 (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, query recommendation system 102 can thus include hardware (e.g., a central processing unit (CPU), a transceiver, a decoder), software (e.g., a set of threads, a set of processes, software in execution) or a combination of hardware and software that facilitates communicating information between query recommendation system 102 and external systems, sources, and/or devices (e.g., entity 114, client entity 118, etc.).

According to multiple embodiments, query recommendation system 102 can facilitate performance of operations executed by and/or associated with ontology component 108, reasoner component 110, entity 114, API 116, and/or client entity 118. For example, as described in detail below, query recommendation system 102 can facilitate: generating an ontology based on unstructured data of a description of an application programming interface; identifying one or more terms of the ontology that correspond semantically to a term of a query; generating a level of confidence corresponding respectively to the one or more terms of the ontology; transforming the query into a second query comprising at least one of the one or more terms of the ontology; presenting the one or more terms of the ontology to an entity; recommending a second query comprising at least one of the one or more terms of the ontology; and/or revising the second query based on feedback corresponding to the second query.

According to multiple embodiments, ontology component 108 can generate an ontology based on unstructured data of a description of an application programming interface (API). As referenced herein, an application programming interface (API) can refer to a set of communication protocols, subroutine definitions, resources, and/or tools to build software applications for a web-based system, an operating system, a database system, a computer hardware system, a software library system, and/or another system. As referenced herein, unstructured data can refer to data that is not formatted as a data model. For instance, such unstructured data can comprise data that is not organized or structured in a pre-defined manner and/or is not stored in fielded form in a database or annotated in a document (e.g., a document formatted as a text file). As referenced herein, a description of an API can refer to, an API specification, an API documentation, an API definition, and/or another description of an API. For instance, such API description can comprise: an API specification (e.g., a broad description of the functionality and expected results of an API); an API documentation (e.g., a detailed description of the API functions and how to utilize the API); an API definition (e.g., a description of machine-readable components of the API); and/or another description of an API.

In some embodiments, to facilitate generating an ontology based on unstructured data of a description of an API, query recommendation system 102 and/or ontology component 108 can obtain such a description from entity 114 and/or API 116. For instance, query recommendation system 102 and/or ontology component 108 can obtain a text file comprising a description of API 116 from entity 114 and/or API 116 via network 120. In some embodiments, entity 114 can comprise a server, a virtual machine, an application, and/or another entity that can comprise API 116. In some embodiments, API 116 can comprise a software library API, a software framework API, an operating system API, a remote API, a Web services API, a source code API, a legacy API, and/or another API that can comprise an API description (e.g., API specification, API documentation, and/or API definition formatted as a text file). In some embodiments, API 116 can comprise a domain-specific API including, but not limited to, an information technology (IT) API, a retail API, a healthcare API, an education API, and/or another domain-specific API.

In some embodiments, to facilitate generating an ontology based on unstructured data of a description of an API, ontology component 108 can extract a dependency tree (e.g., comprising entities and relationships between such entities) from the unstructured data of an API description. In some embodiments, ontology component 108 can generate an ontology based on unstructured data of an API description by employing a rule-based approach (e.g., a rule-based system) to extract a dependency tree (e.g., comprising entities and relationships between such entities) from such unstructured data. In some embodiments, ontology component 108 can employ a rule-based approach comprising a set of rules and an inference engine or semantic reasoner that makes deductions or choices based on the set of rules. For example, ontology component 108 can generate an ontology (e.g., a domain-specific ontology) by employing a rule-based approach to extract one or more nouns (entities) and/or one or more verbs (representing the relationships between such entities) from unstructured data in a description of API 116 (e.g., a domain-specific API).

In some embodiments, ontology component 108 can generate an ontology based on unstructured data of an API description by employing a deep learning approach (also known as deep structured learning or hierarchical learning) to extract a dependency tree (e.g., comprising entities and relationships between such entities) from such unstructured data. In some embodiments, ontology component 108 can extract a dependency tree (e.g., comprising entities and relationships between such entities) from unstructured data in an API description by employing a deep learning approach including, but not limited to, a sequence-to-sequence approach, a deep neural network, deep belief network, recurrent neural network, and/or another deep learning approach. For example, ontology component 108 can generate an ontology (e.g., a domain-specific ontology) by employing a deep learning approach to extract one or more nouns (entities) and/or one or more verbs (representing the relationships between such entities) from unstructured data in a description of API 116 (e.g., a domain-specific API).

In some embodiments, to facilitate generating an ontology based on unstructured data of an API description, ontology component 108 can construct a knowledge graph that can be based on such unstructured data in an API description. For example, ontology component 108 can generate an ontology (e.g., a domain-specific ontology) by constructing a knowledge graph based on unstructured data in a description of API 116 (e.g., a domain-specific API). As referenced herein, a knowledge graph can refer to a plurality of nodes that can constitute respective entities (e.g., nouns representing named entities, such as a person, location, organization, country, product, event, etc.), where each entity can comprise attributes and two or more entities can be connected by an edge (e.g., a verb) that can represent the relationship between the entities. In some embodiments, such attributes of the respective entities can include, but are not limited to, date of birth of a person, an area of a location, and/or another attribute.

In some embodiments, to facilitate constructing a knowledge graph (e.g., a domain-specific knowledge graph) that can be based on unstructured data of a description of an API (e.g., a domain-specific API), ontology component 108 can create a type system for the API description based on unstructured data of the API description (e.g., via employing Common Data Model). For instance, to facilitate creating such a type system, query recommendation system 102 and/or ontology component 108 can obtain an API description from API 116 via network 120. In some embodiments, to facilitate creating a type system for an API description based on unstructured data of an API description, ontology component 108 can tokenize (parse) one or more sections of the API description. For example, ontology component 108 can tokenize (parse) one or more sentences of a description of API 116. As referenced herein, tokenize can refer to a process of classifying and/or demarcating sections of a sequence of characters (e.g., words of a sentence). In some embodiments, ontology component 108 can tokenize one or more sentences of a description of an API using tokens represented in Extensible Markup Language (XML). In some embodiments, ontology component 108 can tokenize one or more sentences of a description of an API using tokens represented as symbolic expressions (s-expression), where such s-expressions can comprise nested list (tree-structured) data.

In some embodiments, to facilitate creating a type system for an API description based on unstructured data of an API description, ontology component 108 can determine one or more part-of-speech tags (POS tags) for each token of a tokenized sentence. As referenced herein, POS tag can refer to categorization of lexical items (e.g., words) having substantially similar grammatical properties. For instance, ontology component 108 can determine one or more POS tags for each token of a tokenized sentence to identify one or more lexical items (e.g., words) of unstructured data in an API description including, but not limited to, nouns, verbs, adjectives, adverbs, pronouns, prepositions, conjunctions, and/or another lexical item. For example, ontology component 108 can determine one or more POS tags for each token of a tokenized sentence by categorizing such tokens into categories that can include, but are not limited to, nouns, verbs, adjectives, adverbs, pronouns, prepositions, conjunctions, and/or another category.

In some embodiments, ontology component 108 can employ POS tagging to identify one or more nouns and/or one or more verbs of unstructured data (e.g., one or more sentences) in an API description, where the nouns identify entities of the API description and the verbs identify the relationship(s) between the nouns (entities) and/or the relationship(s) between the verbs and the nouns (entities). For instance, ontology component 108 can employ POS tagging to identify one or more named entities (nouns) including, but not limited to, a person, location, organization, country, product, event, and/or another named entity (noun). In this example, ontology component 108 can employ POS tagging to identify one or more verbs that identify the relationship(s) between such named entities and/or the relationship(s) between the verbs and the named entities.

According to multiple embodiments, reasoner component 110 can identify one or more terms of an ontology that correspond semantically to a term of a query. For example, reasoner component 110 can identify one or more terms of the ontology generated by ontology component 108 (e.g., as described above) that correspond semantically to a term of a query received by query recommendation system 102, such as, for instance, a query to locate an API (e.g., a domain-specific API) to automate a certain process (e.g., developing a software application). In such an example, client entity 118 can comprise an entity including, but not limited to, a computing device, a human, and/or another entity that can interface with query recommendation system 102. For instance, query recommendation system 102 can comprise a user interface (e.g., natural language interface, graphical user interface (GUI), form-based interface, command line, documentation GUI, etc.) that can facilitate receiving input from client entity 118 (e.g., via network 120). In such embodiments, client entity 118 can input a query (e.g., a natural language query) to query recommendation system 102 to locate an API, such as, for example API 116 (e.g., a Web API, a domain-specific API, etc.) to automate a certain process.

In some embodiments, to facilitate identifying one or more terms of an ontology that correspond semantically to a term of a query, reasoner component 110 can employ a Path Ranking (PR) algorithm to derive one or more hidden relationships between entities of an ontology generated by ontology component 108. For example, reasoner component 110 can employ a Context-aware Path Ranking (C-PR) algorithm to derive one or more hidden relationships between entities of an ontology generated by ontology component 108 (e.g., a domain-specific ontology as described above).

In some embodiments, reasoner component 110 can employ a C-PR algorithm that can learn global semantics of entities of a knowledge graph (e.g., entities of a knowledge graph constructed by ontology component 108 as described above) using word embedding. In such embodiments, the C-PR algorithm can leverage such entity semantics knowledge to enumerate contextually relevant paths (i.e., relationships) between entities using bidirectional random walk. For instance, given two terms of an ontology generated by ontology component 108, such as, for example, "server" and "container," the C-PR algorithm can employ bidirectional random walk to start from the respective entities (nodes) "server" and "container" and meet at an intermediate common node (e.g., an intersecting node or overlapping node). In this example, nodes traversed from "server" can comprise <server, $N_1$, $N_2$, $N_k$> and nodes traversed from "container" can comprise <container, $M_1$, $M_2$, $M_k$>. In such an example, the C-PR algorithm can determine a contextual neighbor of $N_k$ and merge with $M_k$ to determine the complete path (i.e., a relationship between the terms). In this example, the path can constitute a semantic relationship between the terms "server" and "container," and therefore, if a path cannot be determined then it can imply there is no semantic relationship between "server" and "container". In such an example, if "server" is a term of a query input by client entity 118 to query recommendation system 102 (e.g., via a user interface as described above), then reasoner component 110 can employ the C-PR algorithm to determine whether the term "container" of an ontology generated by ontology component 108 corresponds semantically to the query term "server" (e.g., whether the ontology term "container" has a semantic relationship with the query term "server").

In some embodiments, reasoner component 110 can generate a level of confidence corresponding respectively to one or more terms of an ontology identified by reasoner component 110, where the level of confidence can characterize a semantic relationship between the one or more terms of the ontology and a term of a query. For example, reasoner component 110 can employ the C-PR algorithm to determine whether a query term (e.g., "server) has a semantic relationship with a term (e.g., "container") of an ontology generated by ontology component 108 by using random walk to determine whether (or not) a path exists between such terms, where the ontology comprises both terms (e.g., "server" and "container"). In such an example, if the C-PR algorithm determines a path (i.e., a semantic relationship) exists between such terms (e.g., "server" and "container") then reasoner component 110 can further employ the C-PR algorithm to determine the length of such path. In this example, the length of such path can constitute a level of semantic relationship between such terms, for example, whether the terms have a high level of semantic relationship (e.g., closely related, substantially similar) or whether the terms have a low level of semantic relationship (e.g., distantly related, substantially dissimilar). For instance, a substantially short distance between such terms can constitute a high level of semantic relationship (e.g., closely related, substantially similar) that can be indicative of a high level of confidence that the terms are semantically related (i.e., correspond to one another semantically), while a substantially long distance between such terms can constitute a low level of semantic relationship (e.g., distantly related, substantially dissimilar) that can be indicative of a low level of confidence that the terms are semantically related.

Figure 2:
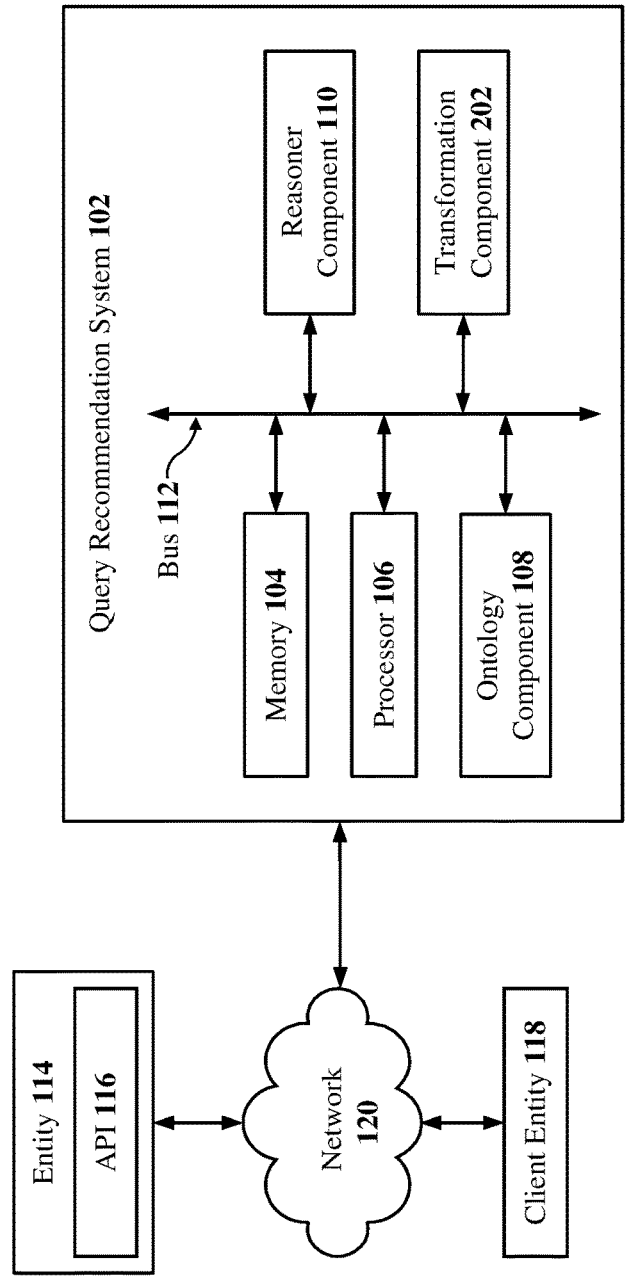
FIG. 2 illustrates a block diagram of an example, non-limiting system that facilitates query recommendation components in accordance with one or more embodiments described herein.

FIG. 2 illustrates a block diagram of an example, non-limiting system 200 that facilitates query recommendation components in accordance with one or more embodiments described herein. Repetitive description of like elements employed in respective embodiments is omitted for sake of brevity. According to several embodiments, system 200 can comprise query recommendation system 102. In some embodiments, query recommendation system 102 can comprise a transformation component 202.

According to multiple embodiments, transformation component 202 can transform a query into one or more second queries that can respectively comprise one or more terms of an ontology generated by ontology component 108. For example, transformation component 202 can transform a query input to query recommendation system 102 by client entity 118 (e.g., as described above with reference to FIG. 1) into one or more second queries respectively comprising at least one of the one or more terms identified by reasoner component 110 as having a semantic relationship with a query term (e.g., as described above with reference to FIG. 1). In some embodiments, to facilitate such transformation of a query into one or more second queries, transformation component 202 can edit one or more terms (e.g., nouns, verbs, etc.) of the query, where such editing can include, but is not limited to, replacing, modifying, deleting, and/or another editing function. For example, transformation component 202 can replace a term of a query (e.g., "server") with a term of an ontology (e.g., "container") that reasoner component 110 identifies as having a semantic relationship with such query term. In another example, transformation component 202 can modify a term (e.g., "served") of a query (e.g., modify spelling, modify characters, modify grammar, etc.) such that the resulting, second query comprises a term (e.g., "server," "container," etc.) of an ontology that reasoner component 110 identifies as having a semantic relationship with such modified query term. In another example, transformation component 202 can delete (remove) one or more terms of a query, resulting in a second query.

Figure 3:
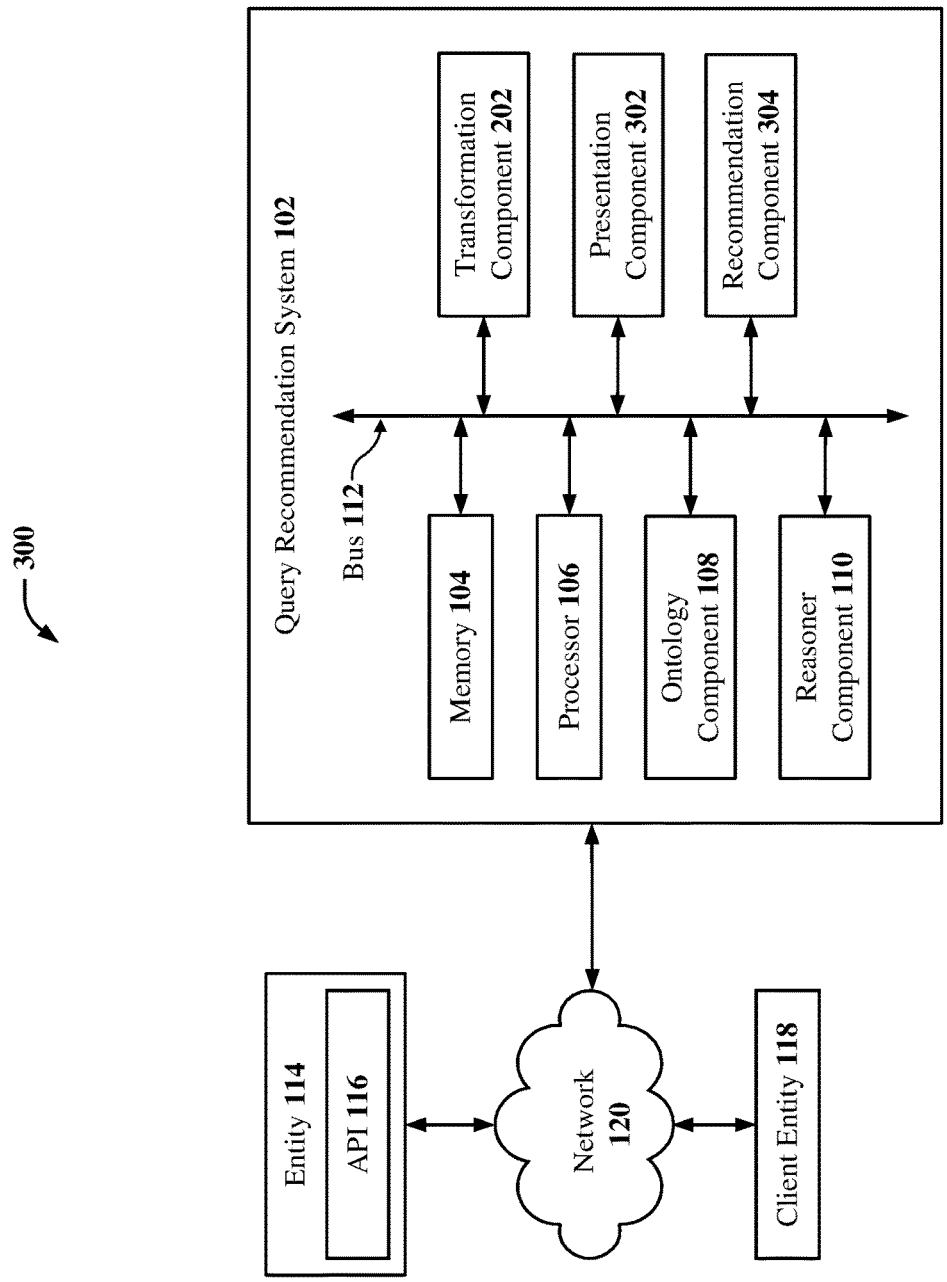
FIG. 3 illustrates a block diagram of an example, non-limiting system that facilitates query recommendation components in accordance with one or more embodiments described herein.

FIG. 3 illustrates a block diagram of an example, non-limiting system 300 that facilitates query recommendation components in accordance with one or more embodiments described herein. Repetitive description of like elements employed in respective embodiments is omitted for sake of brevity. According to several embodiments, system 300 can comprise query recommendation system 102. In some embodiments, query recommendation system 102 can comprise presentation component 302 and/or recommendation component 304.

According to multiple embodiments, presentation component 302 can present, to an entity, one or more terms of an ontology generated by ontology component 108. For example, presentation component 302 can present, to an entity, the one or more terms of an ontology identified by reasoner component 110 as corresponding semantically to a term of a query (e.g., as described above with reference to FIG. 1). In some embodiments, presentation component 302 can present one or more terms of an ontology identified by reasoner component 110 as corresponding semantically to a term of a query by presenting such term(s) to an entity (e.g., client entity 118) via a user interface. For example, presentation component 302 can comprise a user interface (e.g., natural language interface, graphical user interface (GUI), form-based interface, command line, documentation GUI, etc.) that can facilitate presentation of such terms to client entity 118. For instance, presentation component 302 can present such term(s) to client entity 118, via network 120, by presenting such term(s) on a GUI rendered on a screen, display, or monitor of a computing device, such as, for example, client entity 118.

In some embodiments, presentation component 302 can present one or more terms identified by reasoner component 110 as corresponding semantically to a term of a query by presenting such terms in the form of a list, where the terms are arranged in an arbitrary order. In some embodiments, presentation component 302 can present one or more terms identified by reasoner component 110 as corresponding semantically to a term of a query by presenting such terms in the form of a list, where the terms are arranged according to a level of confidence that can constitute a level of semantic relationship between the respective terms identified by reasoner component 110 and a query term (e.g., as described above with reference to reasoner component 110 and FIG. 1). For example, presentation component 302 can present such terms identified by reasoner component 110 in the form of a list arranged from highest level of confidence to lowest level of confidence (or vice versa).

According to multiple embodiments, recommendation component 304 can recommend one or more second queries that can respectively comprise one or more terms of an ontology generated by ontology component 108. For example, recommendation component 304 can recommend one or more second queries (e.g., domain-specific queries) respectively comprising at least one of the one or more terms of an ontology identified by reasoner component 110 as corresponding semantically to a term of a query (e.g., as described above with reference to FIG. 1). In some embodiments, recommendation component 304 can recommend one or more second queries that can respectively comprise one or more terms corresponding to a high level of confidence as determined by reasoner component 110, where such a high level of confidence can constitute a high level of semantic relationship between the respective terms identified by reasoner component 110 and a query term, (e.g., as described above with reference to reasoner component 110 and FIG. 1).

In some embodiments, recommendation component 304 can present one or more second queries generated by recommendation component 304 to an entity. For example, recommendation component 304 can present such one or more second queries to client entity 118 via presentation component 302. In such an example, client entity 118 can select such one or more second queries and execute a search using the selected second query (or queries) to locate an API (e.g., a domain-specific API) to automate a certain process (e.g., developing a software application).

Figure 4:
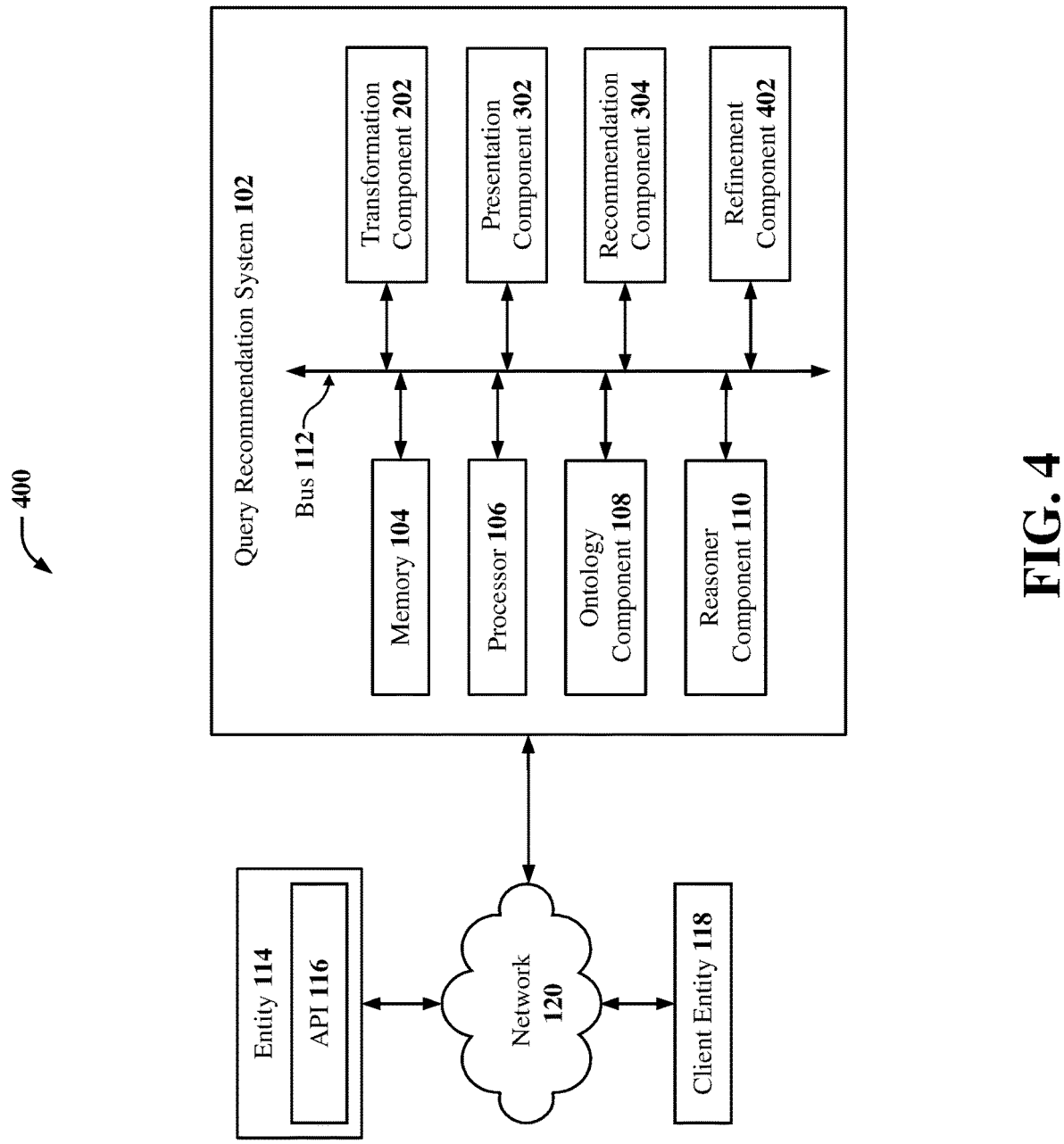
FIG. 4 illustrates a block diagram of an example, non-limiting system that facilitates query recommendation components in accordance with one or more embodiments described herein.

FIG. 4 illustrates a block diagram of an example, non-limiting system 400 that facilitates query recommendation components in accordance with one or more embodiments described herein. Repetitive description of like elements employed in respective embodiments is omitted for sake of brevity. According to several embodiments, system 400 can comprise query recommendation system 102. In some embodiments, query recommendation system 102 can comprise a refinement component 402.

According to multiple embodiments, refinement component 402 can revise a second query based on feedback corresponding to the second query. For example, query recommendation system 102 and/or refinement component 402 can receive feedback from an entity based on a second query recommended by recommendation component 304. In some embodiments, such feedback can include, but is not limited to: feedback that is indicative of correctness (or lack thereof) of one or more terms of the recommended second query (e.g., semantic correctness); feedback that is indicative of effectiveness (or lack thereof) of the recommended second query in locating an API sought by the entity; and/or other feedback. For example, refinement component 402 can receive feedback from client entity 118, via network 120 and a GUI that can enable client entity 118 to input such feedback to query recommendation system 102 and/or refinement component 402. In such an example, client entity 118 can comprise a human (e.g., an end user) operating a computing device (e.g., a general-purpose computer).

In some embodiments, based on feedback received from an entity (e.g., client entity 118) corresponding to a second query recommended by recommendation component 304, refinement component 402 can revise such a second query. For example, refinement component 402 can employ transformation component 202 to edit such recommended second query based on such feedback. For instance, refinement component 402 can employ transformation component 202 to edit one or more terms (e.g., nouns, verbs, etc.) of the recommended second query, where such editing can include, but is not limited to, replacing, modifying, deleting, and/or another editing function. For example, transformation component 202 can replace a term of the recommended second query (e.g., "container") with a term of an ontology (e.g., "host") that reasoner component 110 identifies as having a semantic relationship with such a term of the recommended second query.

In some embodiments, query recommendation system 102 can be a query recommendation system and/or process associated with various technologies. For example, query recommendation system 102 can be associated with latent semantic indexing (LSI) technologies, application programming interface (API) technologies, semantic similarity technologies, semantic reasoning technologies, decision-making technologies, machine learning technologies, deep learning technologies, neural network technologies, supervised recommendation technologies, unsupervised recommendation technologies, knowledge base system technologies, reinforcement learning technologies, artificial intelligence technologies, and/or other technologies.

In some embodiments, query recommendation system 102 can provide technical improvements to systems, devices, components, operational steps, and/or processing steps associated with the various technologies identified above. For example, query recommendation system 102 can generate a domain-specific ontology based on unstructured data of a description of a domain-specific API and identify one or more terms (e.g., nouns, verbs, etc.) of such domain-specific ontology that correspond semantically to a term of a query input to query recommendation system 102 by an entity (e.g., a human user of client entity 118) to locate an API. For instance, query recommendation system 102 can determine hidden semantic relationships between one or more terms of a domain-specific ontology, where one of such terms can be a term of a query and can further recommend a second query comprising at least one of such terms identified as having a semantic relationship with a term of the query (e.g., identified as having a meaning similar to a meaning of a term of the query). In another example, query recommendation system 102 can further generate a level of confidence corresponding respectively to the one or more identified terms, where such level of confidence can constitute a level of semantic relation (e.g., closely related or not, substantially similar or not, etc.) between the one or more identified terms and a term of the query.

In some embodiments, query recommendation system 102 can provide technical improvements to a processing unit associated with a decision-making system (e.g., a query recommendation system and/or a reinforcement learning system). For example, query recommendation system 102 can revise a second query recommended by query recommendation system 102 based on feedback received from an entity (e.g., client entity 118), which can facilitate improved processing accuracy and/or improved processing efficiency associated with processor 106. For instance, based on an entity's feedback (e.g., feedback related to the accuracy of a recommended query, the effectiveness of a recommended query to locate an API, etc.), query recommendation system 102 can revise a recommended query to recommend a query that can effectively locate an API suitable to accomplish the goals of the entity. In this example, such revised recommended queries can facilitate improved processing accuracy of processor 106 with fewer processing cycles, thereby improving processing time, processing efficiency, processing power consumption, and/or processing capacity of processor 106.

In some embodiments, query recommendation system 102 can employ hardware and/or software to solve problems that are highly technical in nature, that are not abstract and that cannot be performed as a set of mental acts by a human. For example, query recommendation system 102 can automatically; generate an ontology based on unstructured data of a description of an application programming interface; identify one or more terms of the ontology that correspond semantically to a term of a query; and/or generate a level of confidence corresponding respectively to the one or more terms of the ontology. In such an example, query recommendation system 102 can employ various mathematical functions and/or algorithms (e.g., a C-PR algorithm as described above with reference to reasoner component 110 and FIG. 1) comprising a multitude of variables, where such mathematical functions and/or algorithms are implemented in a d-dimensional vector space to facilitate execution of the various operations of query recommendation system 102 as described herein.

It is to be appreciated that query recommendation system 102 can perform a query recommendation process utilizing various combinations of electrical components, mechanical components, and circuitry that cannot be replicated in the mind of a human or performed by a human. For example, identifying hidden relationships (paths) between one or more terms of an ontology by employing bidirectional random walk of a C-PR algorithm and recommending a query, in an online environment (e.g., the Internet), are operations that are greater than the capability of a human mind. For instance, the amount of data processed, the speed of processing such data, and/or the types of data processed by query recommendation system 102 over a certain period of time can be greater, faster, and/or different than the amount, speed, and/or data type that can be processed by a human mind over the same period of time.

According to several embodiments, query recommendation system 102 can also be fully operational towards performing one or more other functions (e.g., fully powered on, fully executed, etc.) while also performing the above-referenced query recommendation process. It should be appreciated that such simultaneous multi-operational execution is beyond the capability of a human mind. It should also be appreciated that query recommendation system 102 can include information that is impossible to obtain manually by an entity, such as a human user. For example, the type, amount, and/or variety of information included in ontology component 108, reasoner component 110, entity 114, API 116, client entity 118, transformation component 202, presentation component 302, recommendation component 304, refinement component 402, knowledge graph system 600, and/or knowledge graph system 700 can be more complex than information obtained manually by a human user.

Figure 5:
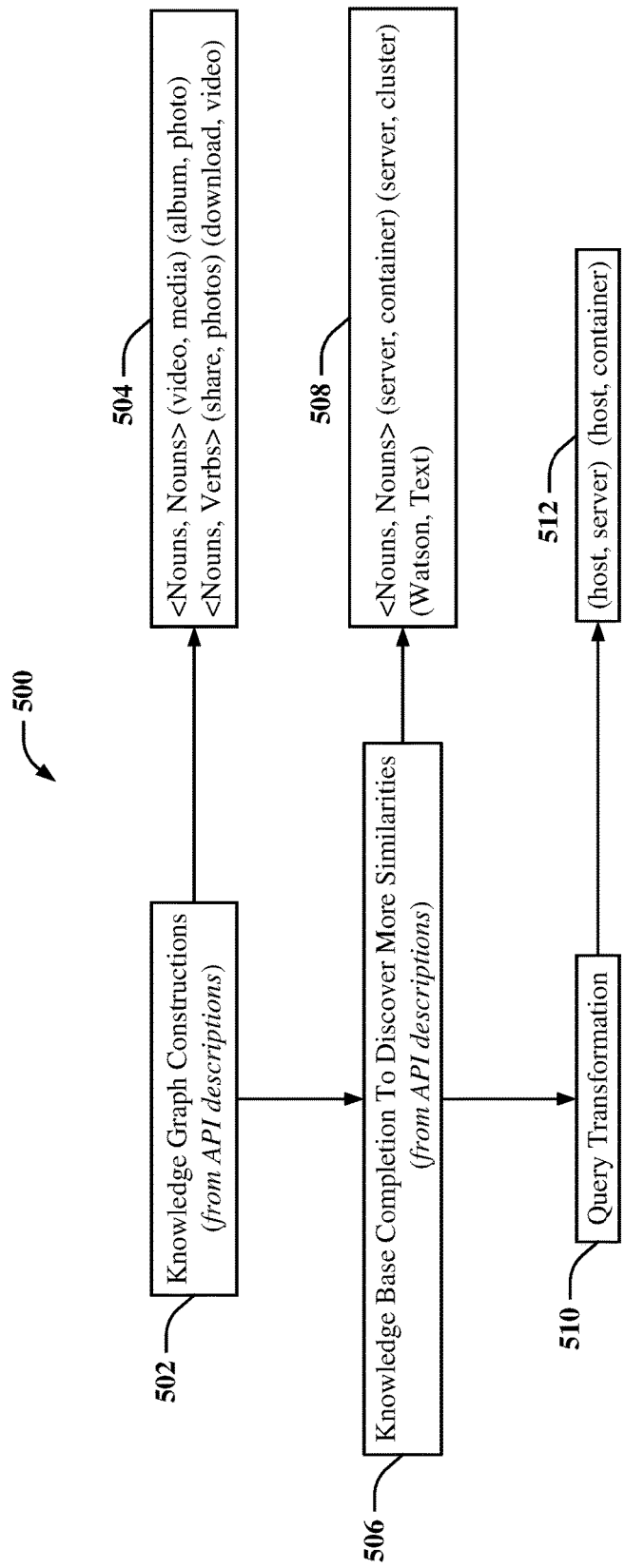
FIG. 5 illustrates a flow diagram of an example, non-limiting computer-implemented method that facilitates query recommendation components in accordance with one or more embodiments described herein.

FIG. 5 illustrates a flow diagram of an example, non-limiting computer-implemented method 500 that facilitates query recommendation components in accordance with one or more embodiments described herein. Repetitive description of like elements employed in respective embodiments is omitted for sake of brevity.

At 502, in some embodiments, query recommendation system 102 can construct a knowledge graph from an API description. For example, as described above with reference to ontology component 108 and FIG. 1, query recommendation system 102 can employ ontology component 108 to construct a knowledge graph from unstructured data of an API description and extract a dependency tree comprising nouns (entities) and verbs that define the relationships between such nouns (entities) of the API description, for instance, as depicted at 504.

At 506, in some embodiments, query recommendation system 102 can execute knowledge base completion to discover one or more similarities (semantic relationships) between entities of an API description. For example, as described above with reference to reasoner component 110 and FIG. 1, query recommendation system 102 can employ reasoner component 110 to execute a C-PR algorithm to derive one or more hidden relationships between nouns (entities) of a knowledge graph and/or an ontology generated by ontology component 108, for instance, as depicted at 508.

At 510, in some embodiments, query recommendation system 102 can transform a query to a second query. For example, as described above with reference to transformation component 202 and FIG. 2, query recommendation system 102 can employ transformation component 202 to transform a query input by an entity to query recommendation system 102 into one or more second queries respectively comprising at least one of the one or more terms identified by reasoner component 110 as having a semantic relationship with a query term, for instance, as depicted at 508, where query term "host" can have a semantic relationship with second query term "server" and second query term "container".

Figure 6:
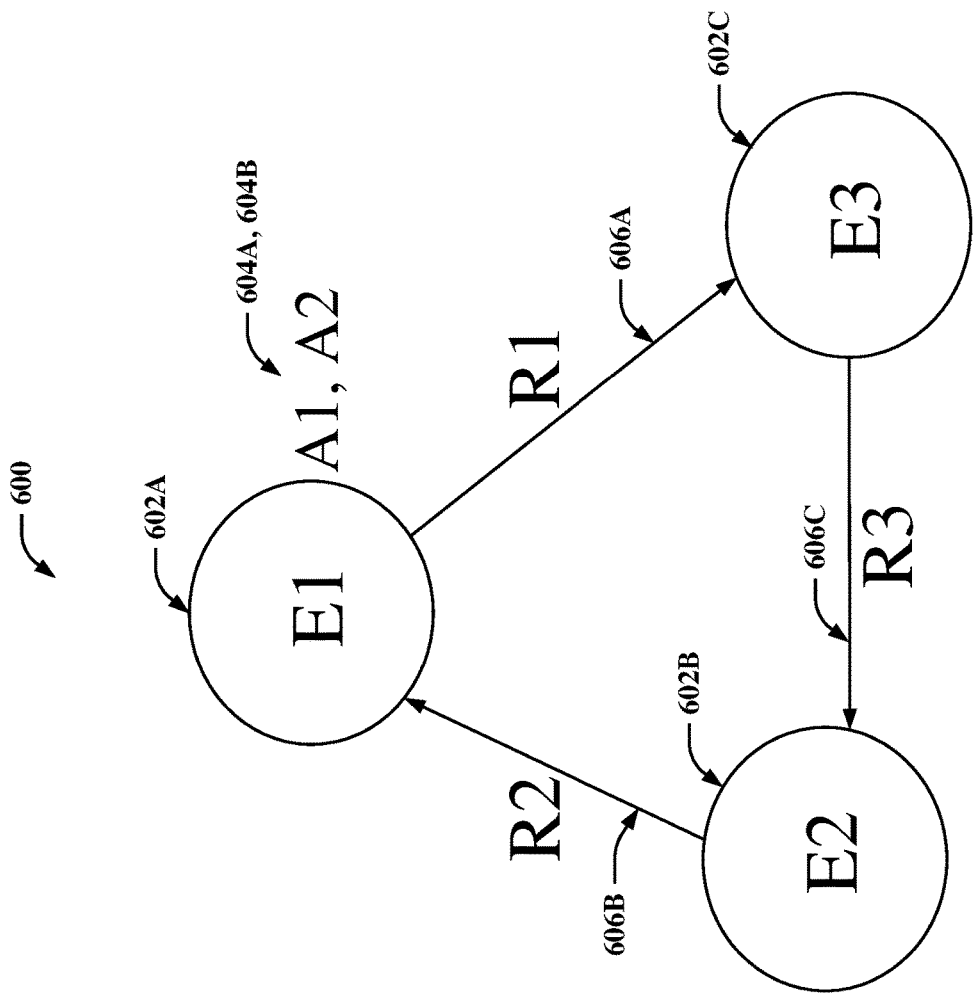
FIG. 6 illustrates a block diagram of an example, non-limiting knowledge graph system that facilitates query recommendation components in accordance with one or more embodiments described herein.

FIG. 6 illustrates a block diagram of an example, non-limiting knowledge graph system 600 that facilitates query recommendation components in accordance with one or more embodiments described herein. Repetitive description of like elements employed in respective embodiments is omitted for sake of brevity. According to several embodiments, knowledge graph system 600 can comprise one or more entities 602A, 602B, 602C (respectively depicted as E1, E2, E3 in the embodiment of FIG. 6) and/or one or more relationships 606A, 606B, 606C (respectively depicted as R1, R2, R3 in the embodiment of FIG. 6). In some embodiments, entities 602A, 602B, 602C can each comprise one or more attributes 604A, 604B (respectively depicted as A1, A2 in the embodiment of FIG. 6).

According to multiple embodiments, knowledge graph system 600 can comprise a non-limiting example embodiment of a knowledge graph that can be constructed by ontology component 108 as described above with reference to FIG. 1. For example, knowledge graph system 600 can comprise a knowledge graph (e.g., a domain-specific knowledge graph) that can be constructed by ontology component 108 based on a knowledge base, such as, for instance, unstructured data of a description of an API (e.g., a domain-specific API).

In some embodiments, entities 602A, 602B, 602C can comprise non-limiting example embodiments of entities (e.g., nouns representing named entities) of a knowledge graph that can be constructed by ontology component 108 as described above with reference to FIG. 1. For example, entities 602A, 602B, 602C can comprise entities, such as, for instance, nouns representing named entities (e.g., person, location, organization, country, product, event, etc.), where such entities can be entities of unstructured data of an API description (e.g., a description of a domain-specific API).

In some embodiments, attributes 604A, 604B can comprise non-limiting example embodiments of entity attributes of a knowledge graph that can be constructed by ontology component 108 as described above with reference to FIG. 1. For example, attributes 604A, 604B can comprise entity attributes, such as, for instance, date of birth of a person, an area of a location, and/or another attribute of entities of unstructured data of an API description (e.g., a description of a domain-specific API).

In some embodiments, relationships 606A, 606B, 606C can comprise non-limiting example embodiments of relationships between entities of a knowledge graph that can be constructed by ontology component 108 as described above with reference to FIG. 1. For example, relationships 606A, 606B, 606C can comprise relationships (e.g., represented as verbs) between entities of unstructured data of an API description (e.g., a description of a domain-specific API). For instance, in a given sentence of unstructured data of an API description, such as, for example, "device A executes application A," the verb "executes" can represent a relationship between the entity "device A" and the entity "application A".

Figure 7:
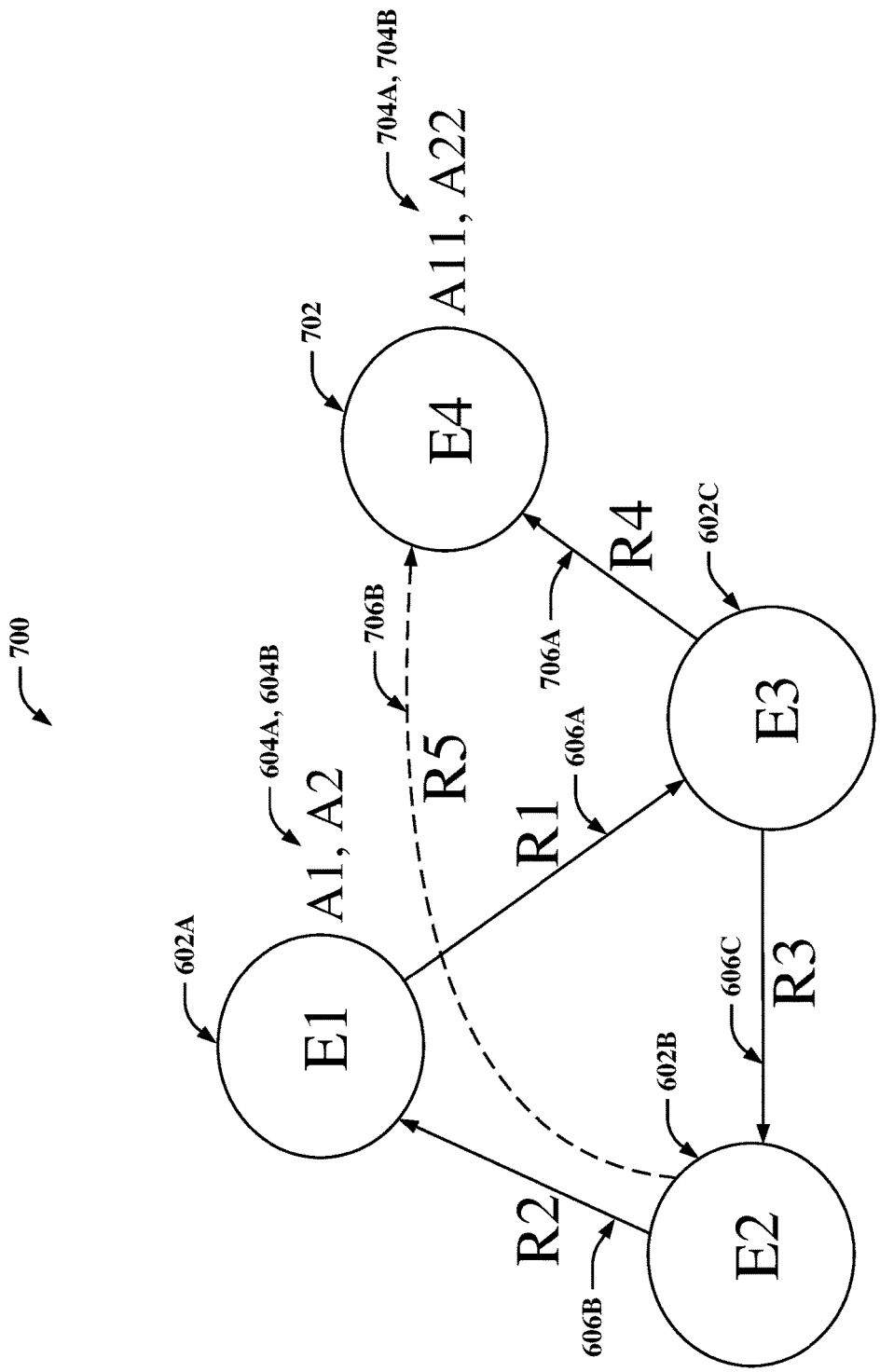
FIG. 7 illustrates a block diagram of an example, non-limiting knowledge graph system that facilitates query recommendation components in accordance with one or more embodiments described herein.

FIG. 7 illustrates a block diagram of an example, non-limiting knowledge graph system 700 that facilitates query recommendation components in accordance with one or more embodiments described herein. Repetitive description of like elements employed in respective embodiments is omitted for sake of brevity. According to several embodiments, knowledge graph system 700 can comprise one or more entities 602A, 602B, 602C, 702 (respectively depicted as E1, E2, E3, E4 in the embodiment of FIG. 7) and/or one or more relationships 606A, 606B, 606C, 706A, 706B (respectively depicted as R1, R2, R3, R4, R5 in the embodiment of FIG. 7). In some embodiments, entities 602A, 602B, 602C, 702 can each comprise one or more attributes 604A, 604B, 704A, 704B (respectively depicted as A1, A2, A11, A22 in the embodiment of FIG. 7).

According to multiple embodiments, knowledge graph system 700 can comprise a non-limiting alternative example embodiment of knowledge graph system 600 described above with reference to FIG. 6. In some embodiments, knowledge graph system 700 can be implemented by reasoner component 110 to derive a hidden relationship (path) between one or more entities of knowledge graph system 700 (e.g., entity 602C and entity 702). In some embodiments, entity 702 can comprise any one of entities 602A, 602B, 602C described above with reference to FIG. 6. In some embodiments, attributes 704A, 704B can comprise any of attributes 604A, 604B described above with reference to FIG. 6. In some embodiments, relationship 706A can comprise any one of relationships 606A, 606B, 606C described above with reference to FIG. 6.

According to multiple embodiments, relationship 706B can comprise a non-limiting example embodiment of a hidden relationship between entities of an ontology generated by ontology component 108 as described above with reference to reasoner component 110 and FIG. 1. For example, relationship 706B can comprise a hidden relationship (path) between entity 602B and entity 702 that can be derived by reasoner component 110 by employing a C-PR algorithm that can implement a bidirectional random walk to derive such hidden relationship (path) between entity 602B and entity 702. For instance, reasoner component 110 can employ a C-PR algorithm that can implement a bidirectional random walk starting from the respective entities 602B, 702 and meet at an intermediate common node (e.g., an intersecting node or overlapping node), such as, for example, entity 602C. In this example, the C-PR algorithm can merge a path (e.g., relationship 606C) between entity 602B and entity 602C with a path (e.g., relationship 706A) between entity 602C and entity 702. In such an example, by merging such paths (e.g., relationship 606C and relationship 706A), the C-PR algorithm can derive relationship 706B, which can constitute a hidden relationship (path) between entity 602B and entity 702.

Figure 8:
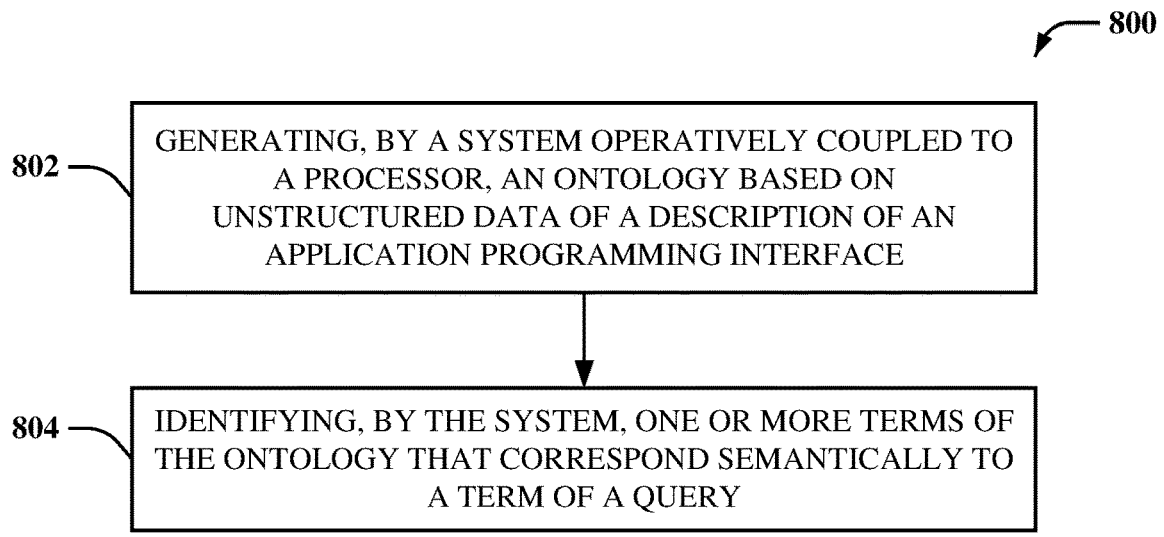
FIG. 8 illustrates a flow diagram of an example, non-limiting computer-implemented method that facilitates query recommendation components in accordance with one or more embodiments described herein.

FIG. 8 illustrates a flow diagram of an example, non-limiting computer-implemented method 800 that facilitates query recommendation components in accordance with one or more embodiments described herein. Repetitive description of like elements employed in other embodiments described herein is omitted for sake of brevity.

At 802, generating, by a system (e.g., via query recommendation system 102 and/or ontology component 108) operatively coupled to a processor (e.g., processor 106), an ontology (e.g., a domain-specific ontology, a type system, and/or knowledge graph system 600) based on unstructured data of a description of an application programming interface (e.g., API 116). At 804, identifying, by the system (e.g., via query recommendation system 102 and/or reasoner component 110), one or more terms (e.g., entities represented as nouns and/or relationships represented as verbs) of the ontology that correspond semantically to a term (e.g., a noun, a verb, etc.) of a query (e.g., a natural language query input by client entity 118 to a GUI of query recommendation system 102 to locate an API to automate a certain process, such as, for example, developing a software application).

Figure 9:
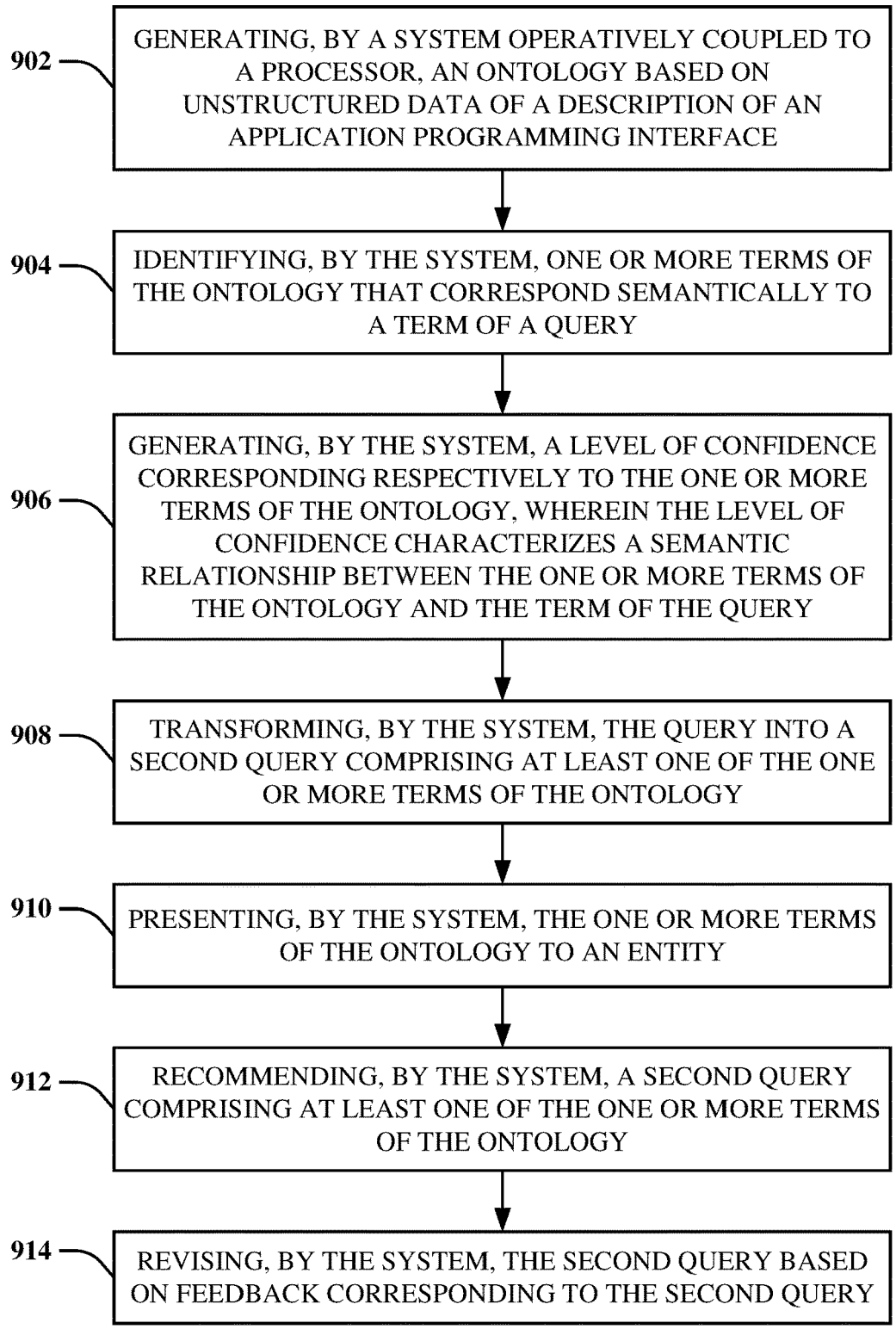
FIG. 9 illustrates a flow diagram of an example, non-limiting computer-implemented method that facilitates query recommendation components in accordance with one or more embodiments described herein.

FIG. 9 illustrates a flow diagram of an example, non-limiting computer-implemented method 900 that facilitates query recommendation components in accordance with one or more embodiments described herein. Repetitive description of like elements employed in other embodiments described herein is omitted for sake of brevity.

At 902, generating, by a system (e.g., via query recommendation system 102 and/or ontology component 108) operatively coupled to a processor (e.g., processor 106), an ontology (e.g., a domain-specific ontology, a type system, and/or knowledge graph system 600) based on unstructured data of a description of an application programming interface (e.g., API 116). At 904, identifying, by the system (e.g., via query recommendation system 102 and/or reasoner component 110), one or more terms (e.g., entities represented as nouns and/or relationships represented as verbs) of the ontology that correspond semantically to a term (e.g., a noun, a verb, etc.) of a query (e.g., a natural language query input by client entity 118 to a GUI of query recommendation system 102 to locate an API to automate a certain process, such as, for example, developing a software application).

At 906, generating, by the system (e.g., via query recommendation system 102 and/or reasoner component 110), a level of confidence corresponding respectively to the one or more terms of the ontology (e.g., one or more terms identified by reasoner component 110 as having a semantic relationship with a term of the query, as described above with reference to FIG. 1). In some embodiments, the level of confidence can characterize a semantic relationship between the one or more terms of the ontology and the term of the query.

At 908, transforming, by the system (e.g., via query recommendation system 102 and/or transformation component 202), the query into a second query comprising at least one of the one or more terms of the ontology (e.g., one or more terms identified by reasoner component 110 as having a semantic relationship with a term of the query, as described above with reference to FIG. 1).

At 910, presenting, by the system (e.g., via query recommendation system 102 and/or presentation component 302), the one or more terms of the ontology (e.g., one or more terms identified by reasoner component 110 as having a semantic relationship with a term of the query, as described above with reference to FIG. 1) to an entity (e.g., client entity 118).

At 912, recommending, by the system (e.g., via query recommendation system 102 and/or recommendation component 304), a second query comprising at least one of the one or more terms of the ontology (e.g., one or more terms identified by reasoner component 110 as having a semantic relationship with a term of the query, as described above with reference to FIG. 1).

At 914, revising, by the system (e.g., via query recommendation system 102 and/or refinement component 402), the second query based on feedback corresponding to the second query (e.g., feedback received by query recommendation system 102 from client entity 118 via a user interface as described above with reference to refinement component 402 and FIG. 4). In some embodiments, such revising can facilitate at least one of improved processing accuracy or improved processing efficiency associated with the processor (e.g., as described above with reference to FIG. 4).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
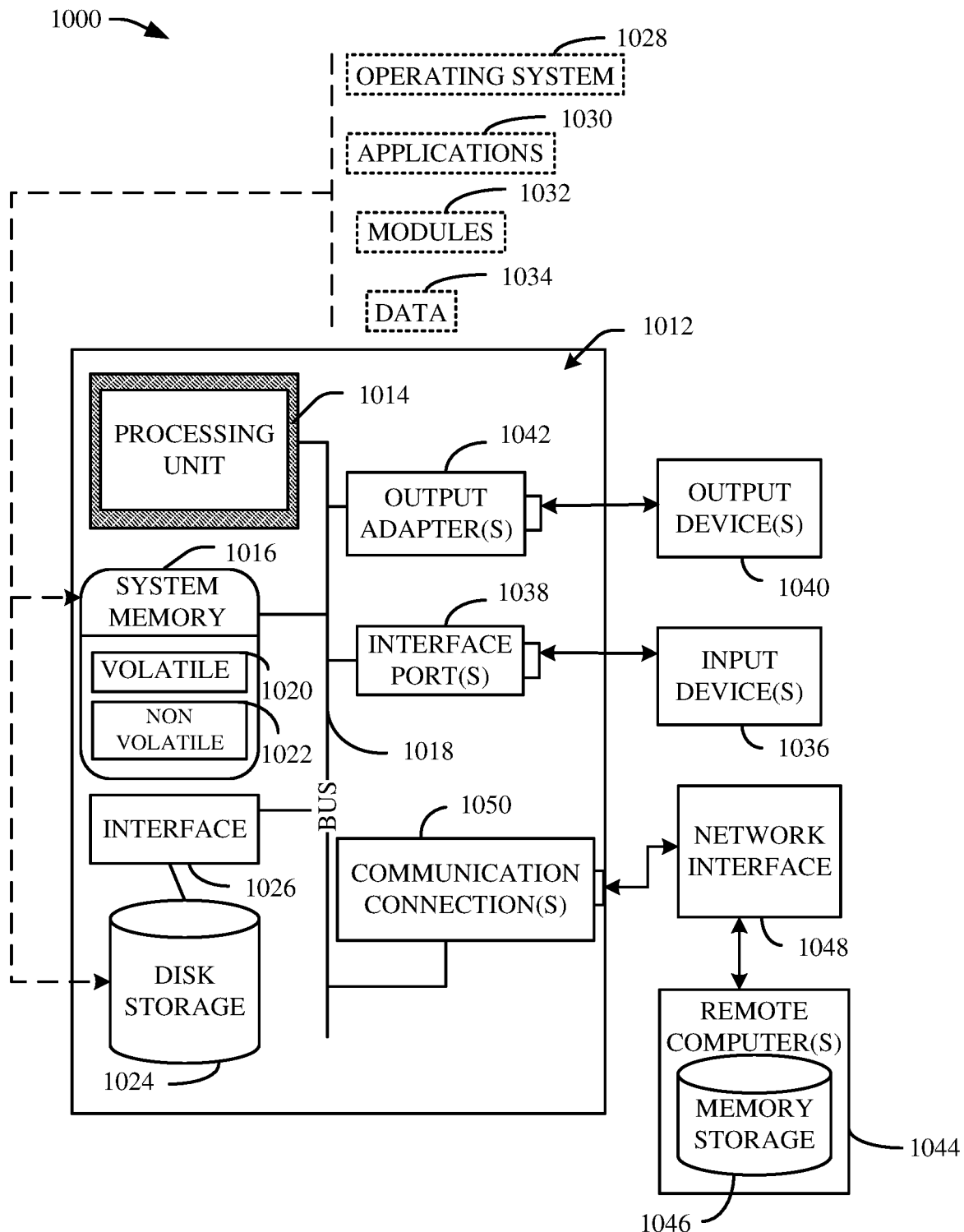
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory, wherein the computer executable components comprise:
an ontology component that generates an ontology based on unstructured data of a description of an application programming interface, wherein the ontology component employs one or more part-of-speech tags to identify one or more named entities and a relationship between the one or more named entities, wherein the one or more part-of-speech tags comprise an adjective, and wherein the one or more named entities comprise an attribute of the one or more named entities;
a reasoner component that identifies one or more terms of the ontology that correspond semantically to a term of a query, wherein based on a knowledge graph comprising edges representing verbs in the ontology, constructed by the ontology component, word embedding is used to learn global semantics, wherein a Context-aware Path Ranking algorithm employs bidirectional random walk; and
a transformation component that modifies spelling or grammar of the term of the query.

2. The system of claim 1, further comprising the transformation component that transforms the query into a second query comprising at least one of the one or more terms of the ontology.

3. The system of claim 1, further comprising a recommendation component that recommends a second query comprising at least one of the one or more terms of the ontology, wherein the one or more parts-of-speech tags further comprise an adverb, pronoun, preposition, or conjunction.

4. The system of claim 3, further comprising a refinement component that revises the second query based on feedback corresponding to the second query, thereby facilitating at least one of improved processing accuracy or improved processing efficiency associated with the processor.

5. The system of claim 1, wherein based on the length of an existing path, the reasoner component generates a level of confidence corresponding respectively to the one or more terms of the ontology, wherein the level of confidence characterizes a semantic relationship between the one or more terms of the ontology and the term of the query.

6. The system of claim 1, further comprising a presentation component that presents the one or more terms of the ontology to an entity.

7. The system of claim 1, wherein the description comprises at least one of: a definition; a document; or a specification.

8. The system of claim 1, wherein the one or more terms of the ontology comprises at least one of: one or more verbs; or one or more nouns.

9. The system of claim 1, wherein the query comprises a natural language query to locate one or more Web application programming interfaces.

10. A computer-implemented method, comprising:
generating, by a system operatively coupled to a processor, an ontology based on unstructured data of a description of an application programming interface;
employing, by the system, one or more part-of-speech tags to identify one or more named entities and a relationship between the one or more named entities, wherein the one or more part-of-speech tags comprise an adjective, and wherein the one or more named entities comprise an attribute of the one or more named entities;
identifying, by the system, one or more terms of the ontology that correspond semantically to a term of a query, wherein
based on a knowledge graph comprising edges representing verbs in the ontology, using word embedding to learn global semantics, wherein
employing bidirectional random walk with a Context-aware Path Ranking algorithm; and
modifying, by the system, spelling or grammar of the term of the query.

11. The computer-implemented method of claim 10, further comprising transforming, by the system, the query into a second query comprising at least one of the one or more terms of the ontology.

12. The computer-implemented method of claim 10, further comprising recommending, by the system, a second query comprising at least one of the one or more terms of the ontology, wherein the one or more parts-of-speech tags further comprise an adverb, pronoun, preposition, or conjunction.

13. The computer-implemented method of claim 12, further comprising revising, by the system, the second query based on feedback corresponding to the second query, thereby facilitating at least one of improved processing accuracy or improved processing efficiency associated with the processor.

14. The computer-implemented method of claim 10, further comprising based on the length of an existing path, generating, by the system, a level of confidence corresponding respectively to the one or more terms of the ontology, wherein the level of confidence characterizes a semantic relationship between the one or more terms of the ontology and the term of the query.

15. The computer-implemented method of claim 10, further comprising presenting, by the system, the one or more terms of the ontology to an entity.

16. A computer program product facilitating a query recommendation process, the computer program product comprising a computer readable storage medium having program instructions embodied therewith, the program instructions executable by a processor to cause the processor to:
generate, by the processor, an ontology based on unstructured data of a description of an application programming interface;
employ, by the processor, one or more part-of-speech tags to identify one or more named entities and a relationship between the one or more named entities, wherein the one or more part-of-speech tags comprise an adjective, and wherein the one or more named entities comprise an attribute of the one or more named entities;
identify, by the processor, one or more terms of the ontology that correspond semantically to a term of a query, wherein
based on a knowledge graph comprising edges representing verbs in the ontology, use word embedding to learn global semantics, wherein
employ bidirectional random walk with a Context-aware Path Ranking algorithm; and
modify, by the system, spelling or grammar of the term of the query.

17. The computer program product of claim 16, wherein the program instructions are further executable by the processor to cause the processor to:

transform, by the processor, the query into a second query comprising at least one of the one or more terms of the ontology.

18. The computer program product of claim 16, wherein the program instructions are further executable by the processor to cause the processor to:
recommend, by the processor, a second query comprising at least one of the one or more terms of the ontology, wherein the one or more parts-of-speech tags further comprise an adverb, pronoun, preposition, or conjunction.

19. The computer program product of claim 18, wherein the program instructions are further executable by the processor to cause the processor to:
revise, by the processor, the second query based on feedback corresponding to the second query, thereby facilitating at least one of improved processing accuracy or improved processing efficiency associated with the processor.

20. The computer program product of claim 16, wherein the program instructions are further executable by the processor to cause the processor to:
based on the length of an existing path, generate, by the processor, a level of confidence corresponding respectively to the one or more terms of the ontology, wherein the level of confidence characterizes a semantic relationship between the one or more terms of the ontology and the term of the query.

\* \* \* \* \*